March 14, 1950  J. J. CAMPODONICO ET AL  2,500,308
MULTISPEED GEAR TRANSMISSION
Filed June 27, 1944
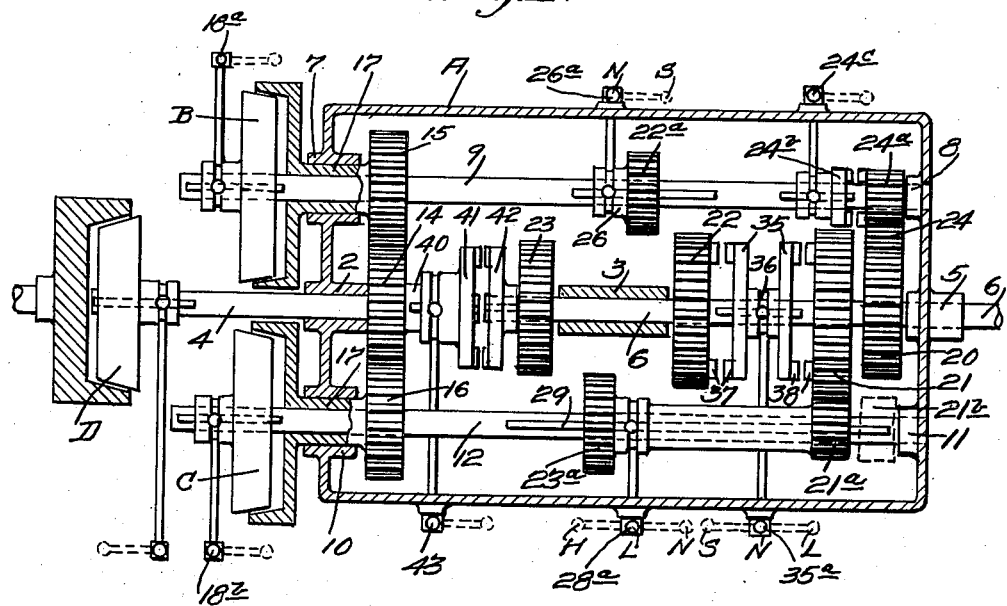
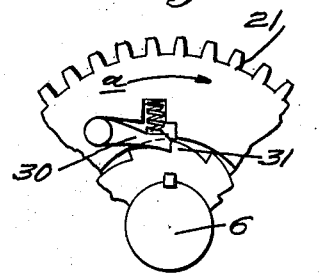
INVENTOR.
JOHN J. CAMPODONICO.
THOMAS CASTBERG.
BY
Castberg & Roemer
Attys.

Patented Mar. 14, 1950

2,500,308

UNITED STATES PATENT OFFICE 2,500,308

MULTISPEED GEAR TRANSMISSION

John J. Campodonico, Stockton, and
Thomas Castberg, Berkeley, Calif.

Application June 27, 1944, Serial No. 542,328

3 Claims. (Cl. 74—331)

This invention relates to a multi-speed gear transmission, and especially to a transmission which is adapted to heavy duty work as in tractors, tanks, trucks and the like.

The object of the present invention is generally to improve and simplify the construction and operation of transmissions of the character described; to provide a multi-speed gear transmission which is provided with two counter-shafts to which power is selectively transmitted either to one or the other or both in unison and from either of which power is transmitted to a common driven or propeller shaft at different speeds; to provide a reverse gear drive between one counter-shaft and the driven shaft so that power may be transmitted to the driven shaft both ahead and reverse; to provide a multi-speed gear transmission in which it is possible to shift from low to second or from second to third, etc., or to shift back from third to second or second to low without interruption of power flow or torque to the propeller shaft; to provide a multi-speed gear transmission in which the gears may be shifted from one speed ratio to another when increasing or decreasing the speed of the driven shaft without clashing of gears thereby doing away entirely with any means for synchronization; to provide a multi-speed gear transmission in which it is possible to have two sets of driving gears of different ratio in mesh while transmitting power through one set; to provide a multi-speed gear transmission in which it is possible to have two sets of gears in mesh, one for ahead drive and one for reverse, and by clutch actuated means selectively to transmit a drive through either; to provide a transmission in which there are a plurality of pairs of driving gears of different speed ratio connecting the respective counter-shafts and the driven shaft and in which one gear of each pair is provided with a one-way clutch causing it to drive in one direction of rotation only and to rotate freely when its shaft rotates at a higher speed; and further, to provide means for positively clutching or locking the gears containing the one-way clutches to their respective shafts when it is desirable to employ the engine or motor as a brake.

The invention is shown by way of illustration in the accompanying drawings, in which:

Fig. 1 is a diagrammatic plan view of the transmission, said view being partially in section; and Fig. 2 is a side elevation partially broken away showing a one-way clutch and a gear whereby the clutch is driven.

Referring to the drawings in detail, and particularly Fig. 1, A indicates a case or housing in which is mounted a multiple speed gear transmission and at one end of which is mounted a pair of clutches generally indicated at B and C. Journalled in bearing 2 formed in the housing adjacent the clutch units is a shaft 4 which will hereinafter be referred to as the drive shaft, and journalled in bearings 3 and 5 aligning with the drive shaft is a driven or propeller shaft 6. Journalled in bearings 7 and 8 at one side of the drive and driven shafts is a counter-shaft 9, and similarly journalled in bearings 10 and 11 on the opposite side of the drive and driven shafts is a counter-shaft 12.

Either of the counter-shafts may transmit power to the driven shaft. They are both clutch actuated and power is transmitted to both clutches from the drive shaft 4 through gears 14, 15 and 16. Gear 14 is keyed or permanently secured to the drive shaft. Gears 15 and 16 on the other hand rotate freely on the counter-shafts 9, 12 as they are keyed or secured to sleeves 17 through which the counter-shafts extend. Formed on the outer end of each of the sleeves 17 is a clutch member 18 and splined to each counter-shaft are cooperating clutch members B and C.

When the drive shaft 4 is rotating, gear 14 will rotate the gears 15 and 16 and the clutch members connected therewith through the sleeves 17. Hence, if it is desired to transmit power to either counter-shaft, it is only necessary to engage one or another of the clutches B and C or to engage both if it is desired to transmit power to both counter-shafts.

In the present instance three speed ratios ahead and one reverse is shown. There are four gears on the driven or propeller shaft 6 and these are indicated at 20, 21, 22 and 23. The gear 20 is secured to the driven shaft and it meshes with a counter or reverse gear 24 in which is mounted a one-way clutch. Counter-shaft 9 carries two gears 22a and 24a. Gear 24a is freely rotatable on the counter-shaft while gear 22a is splined thereto. Gear 24a is provided with clutch teeth which are adapted to be engaged by a jaw clutch 24b which is splined to the counter-shaft. If clutch 24b is engaged a reverse drive will be transmitted to the driven shaft and if the gears 22a and 22 are meshed second speed ahead will be transmitted to the driven shaft.

There are two gears on the counter-shaft 12. They are indicated at 21a and 23a. The gears are connected by a sleeve which is splined to the counter-shaft 12 as indicated at 29. When the sleeve, together with the gears 21a and 23a, are shifted to the right from the position shown on the drawing, both gears will assume neutral position as gear 21a will assume the dotted-line position indicated at 21b. If shifted from that position toward the left, gear 21a will mesh gear 21 and a low gear drive ahead will be transmitted to the driven shaft. If the gears are again shifted to the left, gear 21a will go out of mesh with relation to gear 21, while gear 23a will mesh the gear 23 and the third or high speed ahead will then be transmitted to the driven shaft.

The gears 21 and 21a transmit a low speed ahead. The gears 22 and 22a transmit second speed ahead, the gears 23 and 23a third or high speed ahead, and the gears 20, 24 and 24a a reverse drive. Thus there are three speeds ahead and one reverse.

One of the main features of the present invention is to provide a multi-speed gear transmission of the type here shown wherein it is possible to shift from low to second or from second to third or back again from third to second or from second to low without a break in power flow or torque between either counter shaft and the driven shaft. To accomplish this a one-way clutch similar to that mounted in gear 24 is placed in each of the gears indicated at 21, 22 and 23. Several types of one-way clutches may obviously be employed. A simple form, to wit, a pawl and ratchet type as illustrated in Fig. 2 may be used. For instance, if the gear indicated at 21 in Fig. 2 is driven in the direction of arrow a, the pawl shown at 30 will engage one or another of the teeth 31 formed on a collar which is keyed to the shaft 6, and thus form a driving connection between the gear 21 and the shaft 6. On the other hand, if the direction of rotation of gear 21 is reversed, the pawl 30 will ride freely over the teeth 31 and no power will be transmitted. Similarly, if shaft 6 with the collar having the ratchet teeth formed thereon is rotated in the direction of arrow a at a higher speed than the gear 21 then again the pawl 30 will ride over the ratchet teeth and no power will be transmitted. Thus, if clutch C is engaged so as to transmit power to the counter shaft 12 and if the low gear 21a meshes the gear 21 and gear 21a drives gear 21 in the direction of arrow a, then power will be transmitted ahead to the driven shaft 6. If it is desired to step the speed up from low to second, it is only necessary to mesh the gear 22a with the gear 22 and then to engage the clutch B. When such engagement is made, gear 22 will rotate in the direction of arrow a and power will be transmitted to the driven shaft 6 at a higher speed than that transmitted by the gear 21 and 21a, thus as shaft 6 is revolving at a higher speed, it will overrun the one-way clutch in the gear 21 and power is thus transferred from the low gear to the second gear without any break in power flow or torque as the drive through the gears 21 and 21a is not released until the one-way clutch in the gear 22 takes over the load and increases the speed of the shaft 6.

If the transmission is employed in a tractor and it is hauling a multi-gang of plows, it is possible that the second speed may be too much of a load for the engine, thus after the second speed gears have taken hold, the engine might start to slow down or lug in which case it might be necessary to drop back into low. It should be remembered that clutch C as yet has not been released. It is still transmitting power to the shaft 12 and the gears 21a and 21, even though they are riding free. Thus, if the engine cannot carry the load in second, it is only necessary to slowly release the clutch B and the load will thus be transferred back to the gears 21 and 21a without any break in power flow or torque. On the other hand, if it is desired or possible to advance from second to third or high, then it is essential to mesh the gears 23a and 23 and then to engage the clutch C so that power will be transmitted through the gears 23a and 23 to the driven shaft at the highest speed.

From the foregoing, it should be clear that it is possible with this type of transmission to shift from low to second, and from second to high or vice versa without breaking the power flow or torque between the counter-shafts and the driven shaft and also that it is possible for two gears of different speed ratio to remain in mesh at all times as the gear of the highest ratio will overdrive the driven shaft with relation to the gears of lower ratio. To go into reverse, it is of course essential that the tractor or whatever vehicle the transmission is mounted in should come to a standstill. In that case gear 24a which meshes the reverse gear 24 becomes the driver when clutch 24b and finally clutch B is engaged, a reverse drive will be transmitted to the driven shaft.

While gear 24a meshes the reverse gear 24 it is also possible to have the gear 21a in mesh with the low gear 21. For instance on a bulldozer or like implement it is often desirable to back up and then to go ahead in a low gear ratio, then to back up and then to go ahead again, or in other words, to see-saw the bulldozer for instance when loosening a big boulder, a large tree stump or the like. This is readily accomplished as the clutch B is engaged when backing and clutch C when going ahead. In other words the clutches are alternately engaged and disengaged for such an operation.

If a transmission of this character is installed for instance in a heavy duty truck, it would be of no value if the truck is heavily loaded and going down hill as the brakes alone on a truck of that character cannot be depended upon. That is, it is usual practice for the driver to put the transmission in either second or low when going down hill so as to utilize the compression of the engine as a brake. On order to utilize either the second or low gears indicated at 21 or 22 in this instance a double faced jaw clutch such as indicated at 35 may be employed. This clutch is provided with a shift collar 36 and its opposite faces have jaw teeth 37 and 38 which may engage one gear or another of the gears; thus if it is desired to utilize second gear when going down hill, the jaw clutch is engaged with the gear 22. Conversely, if low is to be employed, the jaw clutch is engaged with the gear 21. The jaw clutch as will be seen is splined to the driven shaft and as such makes it possible to positively dog or lock the gears containing the one-way clutches to the driven shaft and to utilize the engine as a brake.

In transmissions of this character it is usually necessary to employ a synchronizing mechanism so as to synchronize the gears when shifting from low to second or second to third or vice versa. In the present instance a synchronizing mechanism of the character referred to may be entirely eliminated. That is due to the following reason:

If reference will be made to Fig. 2, it will be noted that shaft 6 does not rotate except when driven by one of the gears 20, 21, 22 or 23. For instance, if gear 21 is being driven by gear 21a, then shaft 6 will rotate freely within the gears 22 or 23. These gears are accordingly free on the shaft, as there is nothing to rotate them except friction. However, the gear case will under normal conditions be packed full of heavy grease and the friction of the grease will tend to hold the gears that are not driven from rotating. This is also true of the counter-shafts and the gears carried thereby when not driven by their clutches. When driving in low through clutch C, counter-shaft 12 and gears 21a and 21, the counter-shaft 9, and gears 22a and 24a will tend to stand still and so will the gears 22, 23; thus if it is desired to shift into second, gear 22a is shifted to mesh the gear 22a and no trouble is encountered in meshing these gears as, even though they might rotate due to friction, there is no power being transmitted through these gears, and they are consequently readily and quickly meshed. This is also true of the gears 23a and 23. Hence, there is no reason or need for employing a synchronizing mechanism and the transmission as a whole is accordingly materially simplified.

In the present instance, several shifting levers are illustrated. The lever 18a engages a shifting collar on the clutch B and serves the purpose of engaging or disengaging this clutch. The lever indicated at 18b engages the shifting collar on the clutch C and serves the same purpose, to wit, that of engaging or disengaging the clutch C. Similarly one shifting lever is shown for the gears on each counter-shaft. The lever indicated at 26a engages the shifting collar 26. By throwing the lever to the right or the dotted-line position marked S, the second speed gears 22 and 22a are engaged. In the full line central position marked N, the gears 22 and 22a are out of mesh. The lever indicated at 28a engages the shifting collar on the connected gears 21a and 23a and when the lever assumes the full-line position marked L, gears 21 and 21a mesh. By swinging the lever to the right or the dotted-line position marked N, gears 21a and 23a are out of mesh or in neutral and by swinging the lever to the left or the dotted-line position marked H gears 23a and 23 will mesh. There is a lever indicated at 35a. This lever engages the collar of the jaw clutch 35. In the full-line position marked N, the jaw clutch assumes neutral position. By shifting the lever to the position marked S the jaw clutch engages the gear 22. By shifting to the right or the position marked L, it engages the low speed gear 21. It is obviously possible that fewer levers could be employed but for the purpose of clarity one lever is shown for each of the clutches B and C, one lever for each counter-shaft, one lever for the jaw clutch 35, and one lever 24c for the jaw clutch 24b.

Where a transmission of this character is used in a truck or like vehicle, it is desirable that means be provided whereby a direct drive may be formed between the drive and the driven shaft. To accomplish this, gear 14 is provided with a splined hub 40 on which is mounted a jaw clutch 41. A complementary clutch 42 is keyed to the drive shaft 6; hence by engaging the clutches 41 and 42 a direct drive may be formed. For the purpose of clarity, a lever 43 is shown whereby clutch 41 may be moved into or out of engagement. When clutches 41 and 42 are engaged, clutches B and C are disengaged and the respective counter-shafts and gears carried thereby and cooperating therewith will remain at rest as long as a direct drive is being transmitted. When a direct drive is employed a clutch D interposed between the engine and drive shaft must be employed when changing from high gear to direct and again when changing from direct to high gear. While these and other features of the present invention have been more or less specifically described and illustrated, I nevertheless wish it understood that changes may be resorted to within the scope of the appended claims, and that the materials and finish of the several parts employed may be such as the experience or judgment of the manufacturer may dictate or varying conditions or use may demand.

Having thus described our invention, what we claim and desire to secure by Letters Patent is:

1. In a transmission of the character described, a drive shaft, a driven shaft, a pair of counter shafts cooperating with the driven shaft, a pair of low, a pair of second, and a pair of high speed gears connecting the counter shafts with the driven shaft, a one-way driving clutch cooperating with one gear of each pair, means for selectively transmitting power from the drive shaft to either counter shaft, and means on the driven shaft for locking either the low or second speed gears against one-way clutch operation.

2. In a transmission of the character described, a drive shaft, a driven shaft, a pair of counter shafts cooperating with the driven shaft, a plurality of gears mounted on each counter shaft for rotation therewith and for sliding shifting thereon, a plurality of cooperating gears on the driven shaft, said gears on the counter shafts and driven shaft being arranged in pairs for engagement and disengagement by said sliding shifting, a one-way driving clutch cooperating with one gear of each pair, means for selectively transmitting power from the drive shaft to either counter shaft, and selective means for locking any pair of gears against one-way clutch operation.

3. In a transmission of the character described, a drive shaft, a driven shaft, a pair of counter shafts cooperating with the driven shaft, a plurality of gears mounted on each counter shaft for rotation therewith and for sliding shifting thereon, a plurality of cooperating gears on the driven shaft, said gears on the counter shafts and driven shaft being arranged in pairs for engagement and disengagement by said sliding shifting, a one-way driving clutch cooperating with one gear of each pair, means for selectively transmitting power from the drive shaft to either counter shaft, a plurality of clutches on the driven shaft, one for each pair of gears, and selective means for engaging a clutch to lock a cooperating pair of gears against one-way clutch operation.

JOHN J. COMPODONICO.
THOMAS CASTBERG.

REFERENCES CITED

The following references are of record in the file of this patent:

UNITED STATES PATENTS

| Number | Name | Date |
|---|---|---|
| 1,724,202 | Jacobs | Aug. 13, 1929 |
| 1,856,189 | Johnson et al. | May 3, 1932 |
| 1,906,560 | Fishburne | May 2, 1933 |
| 2,185,602 | Metzler | Jan. 2, 1940 |
| 2,315,808 | Miller | Apr. 6, 1943 |
| 2,394,580 | Banker | Feb. 12, 1946 |

FOREIGN PATENTS

| Number | Country | Date |
|---|---|---|
| 153,993 | Austria | Aug. 10, 1938 |